United States Patent
Goto et al.

(10) Patent No.: US 9,006,138 B2
(45) Date of Patent: Apr. 14, 2015

(54) HONEYCOMB CATALYST BODY

(75) Inventors: Chika Goto, Nagoya (JP); Masataka Yamashita, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 379 days.

(21) Appl. No.: 13/024,538

(22) Filed: Feb. 10, 2011

(65) Prior Publication Data

US 2011/0201493 A1 Aug. 18, 2011

(30) Foreign Application Priority Data

Feb. 16, 2010 (JP) ................................. 2010-030852

(51) Int. Cl.
| | | |
|---|---|---|
| *B01J 35/04* | (2006.01) | |
| *B01D 46/24* | (2006.01) | |
| *B01D 53/94* | (2006.01) | |
| *B01J 23/63* | (2006.01) | |
| *B01J 35/00* | (2006.01) | |
| *B01J 35/02* | (2006.01) | |
| *B01J 37/02* | (2006.01) | |
| *C04B 35/195* | (2006.01) | |

(Continued)

(52) U.S. Cl.
CPC .......... *B01D 46/247* (2013.01); *B01D 46/2429* (2013.01); *B01D 46/2466* (2013.01); *B01D 46/2474* (2013.01); *B01D 53/9454* (2013.01); *B01D 2046/2433* (2013.01); *B01D 2046/2437* (2013.01); *B01D 2255/102* (2013.01); *B01D 2255/9155* (2013.01); *B01J 23/63* (2013.01); *B01J 35/0006* (2013.01); *B01J 35/023* (2013.01); *B01J 35/04* (2013.01); *B01J 37/0248* (2013.01); *C04B 35/195* (2013.01); *C04B 38/0009* (2013.01); *C04B 2111/0081* (2013.01); *C04B 2235/6567* (2013.01); *Y02T 10/22* (2013.01)

(58) Field of Classification Search
None
See application file for complete search history.

(56) References Cited

U.S. PATENT DOCUMENTS

| 4,041,591 A | * | 8/1977 | Noll et al. ................. 29/890.034 |
| 4,420,316 A | * | 12/1983 | Frost et al. ....................... 55/523 |
| 5,171,335 A | * | 12/1992 | Kojima et al. ................... 55/523 |

(Continued)

FOREIGN PATENT DOCUMENTS

| EP | 2 236 783 A1 | 10/2010 |
| EP | 2 364 764 A1 | 9/2011 |

(Continued)

OTHER PUBLICATIONS

Japanese Office Action (Application No. 2010-030852) dated Oct. 8, 2013.

*Primary Examiner* — Melvin C Mayes
*Assistant Examiner* — Colin W Slifka
(74) *Attorney, Agent, or Firm* — Burr & Brown, PLLC

(57) ABSTRACT

There is provided a honeycomb catalyst body including, a honeycomb substrate, plugging portions, and a three way catalyst. All the cells are open in the inflow side end face, the honeycomb substrate has two regions of an inflow side region and an outflow side region, the inflow side region of the honeycomb substrate is a region from the inflow side end face to a position of 10 to 90% of a length in an central axial direction of the honeycomb substrate from the inflow side end face, and 100 to 400 g/L of the three way catalyst is loaded on the partition walls in the inflow side region, no catalyst is loaded on the partition walls in the outflow side region, and a ratio of the length to a diameter of the inflow side end face of the honeycomb substrate is 1.1 to 2.0.

1 Claim, 4 Drawing Sheets

(51) Int. Cl.
*C04B 38/00* (2006.01)
*C04B 111/00* (2006.01)

(56) References Cited

U.S. PATENT DOCUMENTS

| | | | |
|---|---|---|---|
| 2004/0161373 A1* | 8/2004 | Ichikawa et al. | 422/180 |
| 2004/0258582 A1 | 12/2004 | Miwa et al. | |
| 2006/0185335 A1 | 8/2006 | Ichikawa | |
| 2008/0155952 A1* | 7/2008 | Okazaki et al. | 55/523 |
| 2008/0241009 A1 | 10/2008 | Ohno et al. | |
| 2010/0061903 A1* | 3/2010 | Kohara et al. | 423/213.2 |

FOREIGN PATENT DOCUMENTS

| | | |
|---|---|---|
| GB | 2 342 056 A1 | 4/2000 |
| JP | 2003-154223 A1 | 5/2003 |
| JP | 2003-254034 A1 | 9/2003 |
| JP | 2006-231162 A1 | 9/2006 |
| WO | 2008/126328 A1 | 10/2008 |

* cited by examiner ably removing particulate matter contained in exhaust gas discharged from a gasoline direct injection having little increase in pressure loss and purifying CO, HC, and NOx contained in exhaust gas with high efficiency right from the engine starting.

HONEYCOMB CATALYST BODY

FIELD OF THE INVENTION

Background of the Invention

The present invention relates to a honeycomb catalyst body. More preferably, the present invention relates to a honeycomb catalyst body capable of efficiently removing particulate matter contained in exhaust gas discharged from a gasoline direct injection having little increase in pressure loss and purifying CO, HC, and NOx contained in exhaust gas with high efficiency right from the engine starting.

DESCRIPTION OF RELATED ART

Fuel consumption reduction in automobiles is demanded from the viewpoints of protection of the global environment and resource saving. Regarding a gasoline engine mainly used in a passenger vehicle, fuel direct injection is proceeding to improve gasoline mileage.

Conventionally, since a gasoline engine has employed an intake port fuel injection system, soot (particulate matter: PM) generation was little and almost unquestioned. However, in the case of gasoline direct injection, since PM generation is more in comparison with the case of intake port fuel injection, and a countermeasure for inhibiting the generated PM from being released into the atmosphere has been required.

On the other hand, there is used a honeycomb structure as a trapping filter for removing particulate matter discharged from a diesel engine. As the honeycomb structure used as the particulate matter-trapping filter, there is used a plugged honeycomb structure provided with plugging portion in predetermined portions in both the end faces (see, e.g., JP-A-2003-254034). Here, the plugged honeycomb structure is provided with a honeycomb structure portion having porous partition walls separating and forming a plurality of cells functioning as fluid (exhaust gas, purified gas) passages and an outer peripheral wall located in the outermost periphery, and plugging portion disposed in "opening portions of predetermined cells in the end face on the fluid (exhaust gas) inlet side" and "opening portions of the remaining cells in the end face on the fluid (exhaust gas) outlet side". By such a plugged honeycomb structure, exhaust gas flows into cells from the end face on the exhaust gas inlet side, the exhaust gas entering the cells passes through partition walls, and exhaust gas (purified gas) which passed through the partition walls is discharged from the end face on the exhaust gas outlet side. When the exhaust gas passes through the partition walls, PM contained in exhaust gas is trapped by partition walls, and the exhaust gas becomes purified gas.

Therefore, there can be considered a method where a plugged honeycomb structure used for removing particulate matter discharged from a diesel engine as described above is used for removing particulate matter discharged from a gasoline engine.

However, in order to treat exhaust gas discharged from a gasoline engine, there have conventionally been used a three way catalyst converter, NOx adsorber reduction catalyst, and the like. Therefore, when a plugged honeycomb structure is further mounted in the exhaust system, a pressure loss in the exhaust system increases, and a problem such as depression of engine output is considered to be caused.

Therefore, substitution of a plugged honeycomb structure with a three way catalyst loaded on the partition walls thereof for the aforementioned three way catalyst converter, NOx adsorber reduction catalyst, and the like can be considered.

However, in the plugged honeycomb structure, opening portions in an end portion of predetermined cells and opening portions in the other end portion of the remaining cells are plugged with plugging portions, and a thermal capacity in both the end portions of the plugged honeycomb structure is large due to the formation of the plugging portions. Therefore, there arises a problem of taking time for rise in temperature in both the end portions upon warming air right after the engine starting. That is, there is a problem of insufficient purification efficiency because it takes time for the catalyst loaded on both the end portions to reach temperature required for activating the catalyst. As a method for solving the problem of taking time for rise in temperature, increasing the amount of the catalyst to be loaded can be considered. However, increase in the catalyst amount causes increase in the amount of a catalyst noble metal to be used, and there arise problems of increase of costs and waste of resources.

On the other hand, the thermal efficiency of an engine is being raised for the purpose of improving gasoline mileage of an automobile. However, when thermal efficiency of an engine is raised, since the temperature of exhaust gas discharged from an engine falls, there arises a problem of taking more time for increase in temperature.

Since the fuel used is different between a gasoline engine and a diesel engine, the particle diameter, shape, and components of PM in exhaust gas are different as well as the PM amount in exhaust gas is different. Therefore, also, optimum constitution (characteristics) of the honeycomb structure for trapping PM in exhaust gas is different between a gasoline engine and a diesel engine.

SUMMARY OF THE INVENTION

The present invention has been made in view of such problems of prior art and aims to provide the honeycomb catalyst body capable of efficiently removing particulate matter contained in exhaust gas discharged from a gasoline direct injection engine having little increase in pressure loss, and purifying CO, HC, and NOx contained in exhaust gas with high efficiency right from the engine starting.

According to the present invention, there is provided the following honeycomb catalyst body.

[1] A honeycomb catalyst body comprising: a honeycomb substrate having porous partition walls separating and forming a plurality of cells passing through from an inflow side end face to an outflow side end face and functioning as fluid passages, plugging portions disposed so as to plug opening portions of part of the cells in the outflow side end face of the honeycomb substrate, and a three way catalyst loaded on the honeycomb substrate; wherein all the cells are open in the inflow side end face, the honeycomb substrate has two regions of an inflow side region as a region on a fluid inflow side and an outflow side region as a region on a fluid outflow side, the inflow side region of the honeycomb substrate is a region from the inflow side end face to a position of 10 to 90% of a length in an central axial direction of the honeycomb substrate from the inflow side end face, and 100 to 400 g/L of the three way catalyst is loaded on the partition walls in the inflow side region, a catalyst whose amount per unit volume is smaller than the three way catalyst loaded on the partition walls in the inflow side region and is 100 g/L or less is loaded, or no catalyst is loaded on the partition walls in the outflow side region of the honeycomb substrate, and a ratio of the length in the central axial direction of the honeycomb substrate to a diameter of the inflow side end face of the honeycomb substrate is 1.1 to 2.0.

[2] A honeycomb catalyst body according to [1], wherein the honeycomb substrate has a partition wall thickness of 38.0 to 245.0 μm, a cell density of 16 to 186 cells/cm$^2$, a partition wall porosity of 35 to 70%, and a partition wall average pore size of 4 to 40 μm.

[3] A honeycomb catalyst body according to [1] or [2], wherein the plugging portions are disposed so as to plug adjacent cells alternately, or wherein, when a cell group consisting of adjacent cells is defined as a unit cell group, the plugging portions are disposed so as to plug adjacent unit cell groups alternately.

According to a honeycomb catalyst body of the present invention, since it is provided with a honeycomb substrate having porous partition walls separating and forming a plurality of cells passing through from an inflow side end face to an outflow side end face and functioning as fluid passages, and plugging portions disposed so as to plug opening portions of part of the cells in the outflow side end face of the honeycomb substrate, exhaust gas particulate matter discharged from a gasoline direct injection engine can efficiently be removed. In addition, since the cells opening in both the end portions (that is, through-holes passing through from the inflow side end face to the outflow side end face) are formed, an increase in pressure loss is little. Further, since all the cells are open in the inflow side end face, thermal capacity in the end portion on the inflow side end face is low in comparison with the case that plugging portions are disposed (i.e., the case that opening portions of cells in the inflow side end face are plugged). Therefore, when a honeycomb catalyst body is disposed in such a manner that exhaust gas discharged from an engine directly touches the inflow side end face, CO, HC, and NOx contained in exhaust gas can be purified with high efficiency right from the engine starting.

REFERENCE NUMERALS

1: exhaust gas purification apparatus, 2: inflow side end face, 3: outflow side end face, 4: cell, 4a: part of the cells (predetermined cells) 4b: remaining cells, 5: partition wall, 6: honeycomb substrate, 8: plugging portion, 40, 50, 60, 100: honeycomb catalyst body, 22: inlet, 23: outlet: 30: can, 31: inflow side region, 32: outflow side region, 34: unit cell group, 34a: predetermined unit cell group, 34b: remaining unit cell group, 40: cushion material, G1: exhaust gas, G2: purified exhaust gas

DETAILED DESCRIPTION OF THE INVENTION

Hereinbelow, embodiments of the present invention will be described. However, the present invention is by no means limited to the following embodiments, and it should be understood that embodiments where changes, improvements, and the like are suitably added to the following embodiments on the basis of ordinary knowledge of a person of ordinary skill within the range of not deviating from the gist of the present invention are included in the scope of the present invention.

Figure 1:
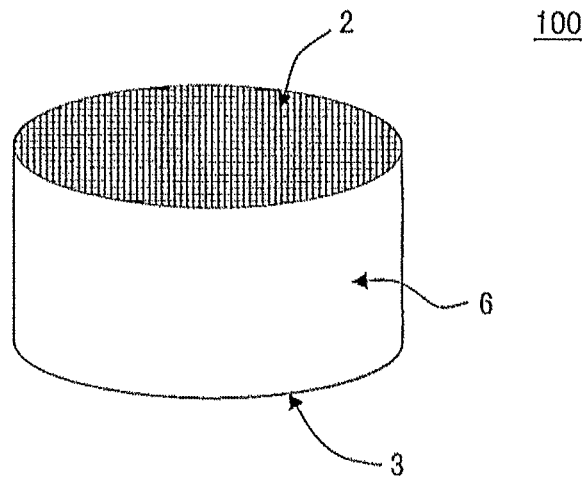
FIG. 1 is a perspective view schematically showing an embodiment of a honeycomb catalyst body of the present invention.
Figure 2:
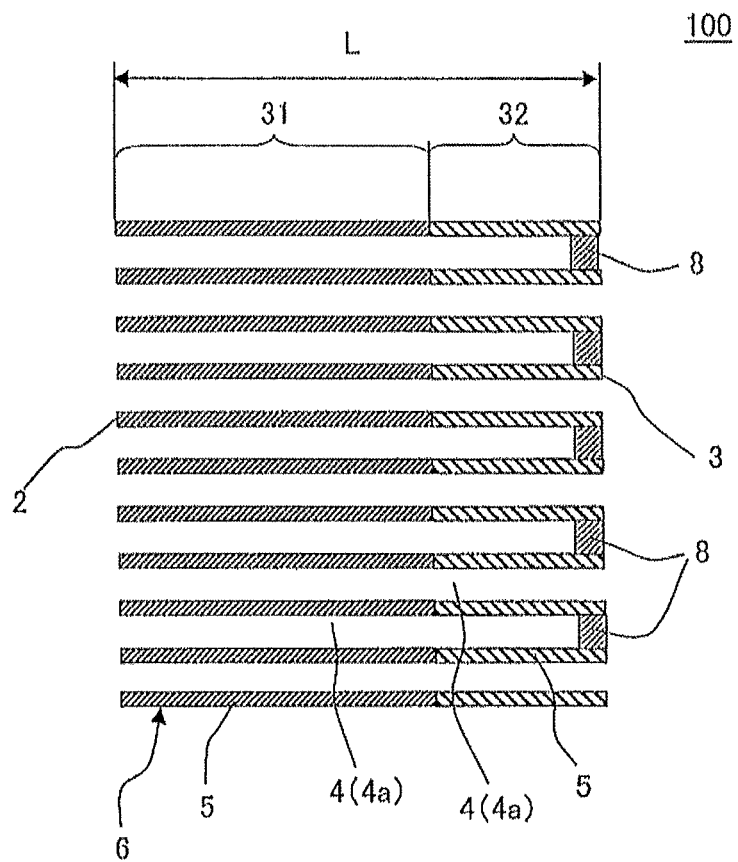
FIG. 2 is a schematic view showing a cross section parallel to the central axis of an embodiment of a honeycomb catalyst body of the present invention.

[1]: Honeycomb Catalyst Body:

FIG. 1 is a perspective view schematically showing an embodiment of a honeycomb catalyst body of the present invention, and FIG. 2 is a schematic view showing a cross section parallel to the central axis of an embodiment of a honeycomb catalyst body of the present invention. As shown in FIG. 2, a honeycomb catalyst body 100 of the present invention is provided with a honeycomb substrate 6 having porous partition walls 5 separating and forming a plurality of cells 4 passing through from an inflow side end face 2 to an outflow side end face 3 and functioning as fluid passages, plugging portions 8 disposed so as to plug opening portions of part of the cells 4 (predetermined cells 4a) in the outflow side end face 3 of the honeycomb substrate 6, and a three way catalyst loaded on the honeycomb substrate 6. In the honeycomb catalyst body 100, all of the cells 4 are open on the inflow end face 2.

The honeycomb substrate 6 has two regions which are the inflow side region 31, which is a region on the fluid inflow side, and the outflow side region 32, which is a region on the fluid outflow side. The inflow side region 31 of the honeycomb substrate 6 is a region from the inflow side end face 2 to a position of 10 to 90% of a length in an central axial direction of the honeycomb substrate 6 from the inflow side end face 2, and 100 to 400 g/L per unit volume of the three way catalyst is loaded on the partition walls 5 in the inflow side region 31. In addition, a catalyst whose amount per unit volume is smaller than the three way catalyst loaded on the partition walls 5 in the inflow side region 31 and is 100 g/L or less is loaded, or no catalyst is loaded on the partition walls 5 in the outflow side region 32 of the honeycomb substrate 6. Further, a ratio of the length in the central axial direction of the honeycomb substrate 6 to a diameter of the inflow side end face 2 of the honeycomb substrate 6 is 1.1 to 2.0.

Since the honeycomb catalyst body 100 is provided with a honeycomb substrate 6 having porous partition walls 5, exhaust gas particulate matter discharged from a gasoline direct injection can efficiently be removed. That is, since cells 4 (remaining cells 4b), which are open in both of the end portions (i.e., through-hole passing through from the inflow side end face 2 to the outflow side end face 3) are formed in a honeycomb catalyst body 100, a part of the particulate matter contained in exhaust gas discharged from the gasoline direct injection engine passes through honeycomb catalyst body 100. However, even when the particulate matter contained in exhaust gas cannot be removed completely, the amount of particulate matter contained in exhaust gas discharged from a gasoline engine is by far smaller than that of the particulate matter contained in exhaust gas discharged from a diesel engine. Therefore, with the honeycomb catalyst body 100, particulate matter discharged without being removed is very little.

In addition, since the cells 4 (remaining cells 4b), which are open in both the end portions (i.e., through-hole passing through from the inflow end face 2 to the outflow end face 3), are formed, the increase in pressure is little. Further, since all of the cells 4 are open in the inflow side end face 2, a thermal capacity of the end portion on the inflow side end face 2 side is small in comparison to the case where the plugging portions are disposed (i.e., openings of cells 4 in the inflow side end face 2 are plugged). That is, temperature of the end portion on the inflow side end face 2 is easily raised by the heat of the exhaust gas, and the three way catalyst loaded on the portion is activated in a short period of time right from the engine starting. Therefore, according to the honeycomb catalyst body 100, CO, HC, and NOx contained in exhaust gas can be purified with high efficiency right from the engine starting.

[1-1] Honeycomb Substrate:

The honeycomb substrate 6 has a honeycomb shape having porous partition walls 5 separating and forming a plurality of cells 4 passing through from the inflow side end face 2 to the outflow side end face 3 and functioning as fluid passages. In addition, in the honeycomb substrate 6, all the cells 4 are open in the inflow side end face 2. That is, the opening portions of all the cells 4 are not plugged in the inflow side end face 2. That is, an increase in thermal capacity due to the formation of the plugging portions in the inflow side end face 2 can be avoided. That is, since temperature of the end portion on the inflow side can easily be raised due to the heat of exhaust gas, the temperature rises up to the activation temperature of the three way catalyst loaded on the end portion on the inlet side of the honeycomb substrate 6 in an early stage right after the engine starting. Therefore, CO, HC, and NOx contained in exhaust gas can be purified with high efficiency right from the engine starting.

The thickness of the partition walls 5 is preferably 38.0 to 245.0 μm, more preferably 38 to 200 μm, particularly preferably 50 to 150 μm. When it is below 38.0 μm, strength of the honeycomb substrate 6 may be depressed. On the other hand, when it is above 245.0 μm, pressure loss when exhaust gas passes through the cells 4 may increase. The thickness of the partition walls 5 is measured by a method where a cross section parallel to the central axis is observed by a microscope.

The cell density (i.e., cell density in a cross section perpendicular to the central axis of the honeycomb substrate 6) of the honeycomb substrate 6 (honeycomb catalyst body 100) is preferably 16 to 186 cells/cm$^2$, more preferably 50 to 120 cells/cm$^2$, particularly preferably 50 to 95 cells/cm$^2$. When the cell density is below 16 cells/cm$^2$, strength of the honeycomb catalyst body 100 may be depressed. On the other hand, when it is above 186 cells/cm$^2$, pressure loss may increase.

The porosity of the partition walls 5 is preferably 35 to 70%, more preferably 38 to 45%, particularly preferably 38 to 43%. When the porosity is below 35%, pressure loss may increase. On the other hand, when it is above 70%, a honeycomb catalyst body 100 is brittle and may easily be broken. The porosity of the partition walls 5 is measured by a mercury porosimeter.

In the honeycomb substrate 6, the ratio (L/D) of the length L (see FIG. 2) in the central axial direction with respect to the diameter D (see FIG. 3) of the inflow side end face 2 is 1.1 to 2.0, preferably 1.2 to 1.8, further preferably 1.2 to 1.5. When it is below 1.1, since the flow rate of exhaust gas passing through the partition walls 5 is reduced, a reduction in the particulate matter-trapping efficiency may be caused. On the other hand, when it is above 2.0, since the cell flow passage pressure loss is increased, the pressure loss in the entire system becomes excessive to cause a defect of depression of engine output.

The average pore size of the partition walls 5 is preferably 4 to 40 μm, more preferably 6 to 15 μm, particularly preferably 8 to 14 μm. When it is below 4 μm, pressure loss may increase even in the case that deposition of the particulate matter is a little. On the other hand, when it is above 40 μm, the honeycomb catalyst body 100 is brittle to easily cause breakage, or trapping performance of the particulate matter is decreased. The average pore size of the partition walls 5 is measured by a mercury porosimeter.

As described above, the honeycomb substrate 6 has two regions, the inflow side region 31, which is a region on the fluid inflow side, and the outflow side region 32, which is a region on the fluid outflow side. The inflow side region 31 is a region from the inflow side end face 2 to a position of 10 to 90% of a length in an central axial direction of the honeycomb substrate 6 from the inflow side end face 2. That is, the inflow side region 31 is a region extending from the inflow end face 2 to a predetermined position in the axial direction (cell 4 extension direction) of the honeycomb substrate 6, and the predetermined position is a position 10 to 90% of the length in the central axial direction of the honeycomb substrate 6 from the inflow side end face 2. In addition, the predetermined position is in the range of a position of preferably 35 to 75%, more preferably 30 to 50% of the length in the axial direction of the honeycomb substrate 6 from the inflow side end face 2. When the region is from the inflow side end face 2 to a position that is less than 10% of the length in the central axial direction of the honeycomb substrate 6 from the inflow side end face 2, the region where the three way catalyst is loaded is small, and exhaust gas is not purified sufficiently. On the other hand, when the region is a region from the inflow side end face 2 to a position more than 90% of the length in the central axis direction of honeycomb substrate 6 from the inflow side end face 2, the pressure loss becomes excessive.

Though the shape of the cells 4 of the honeycomb substrate 6 is not particularly limited, the shape is preferably a polygon such as a triangle, a quadrangle, a pentagon, a hexagon, and an octagon, a circle, or an ellipse, or may be an irregular shape. Also, a combination of a quadrangle and an octagon is preferable.

In addition, a cell hydraulic diameter in the honeycomb substrate 6 may be the same in all the cells, or the hydraulic diameter in the cells 4 open in the inflow side end face 2 and that in the cells 4 open in the outflow side end face 3 may be different. Though any of these cases may be employed, it is preferable that the cells 4 have different hydraulic diameters. Specifically, in the case of purifying exhaust gas from a gasoline engine, it is preferable to make the hydraulic diameter of the cells 4 open in the inflow side end face 2 smaller than that of the cells 4 open in the outflow side end face 3, and it is preferable that the hydraulic diameter of the cells 4 open in the inflow side end face 2 is 20 to 45% of that of the cells 4 open in the outflow side end face 3. In the present specification, the "cell hydraulic diameter" is a value calculated by the formula of "4×(cross sectional area)/(circumferential length)". Here, the "cross sectional area" is an area of a cell in a cross section perpendicular to the cell extension direction, and the "circumferential length" is a "length of outer periphery of a cell" in a cross section perpendicular to the cell extension direction.

The honeycomb substrate 6 (partition walls 5) employs ceramic as the main component. Specific material for the partition walls 5 is preferably at least one kind selected from the group consisting of silicon carbide, silicon-silicon carbide based composite material, cordierite, mullite, alumina, spinel, silicon carbide-cordierite based composite material, lithium aluminum silicate, and aluminum titanate. Of these, cordierite, which has small thermal expansion coefficient and excellent thermal shock resistance, is preferable. In addition, "employs ceramic as the main component" means contains ceramic at 90% by mass or more in the entire components.

The outer shape of the honeycomb substrate (honeycomb catalyst body 100) is not limited to a circular cylindrical shape as shown in FIG. 1, and there may be employed, for example, an elliptic cylindrical shape, a polygonal bottom-shaped cylindrical shape such as a quadrangular cylindrical shape, or an irregular bottom-shaped cylindrical shape. In addition, as the size of the honeycomb substrate 6 (honeycomb catalyst body 100), the length L (see FIG. 2) in the central axial direction is preferably 75 to 200 mm. In addition, for example, when the outer shape of the honeycomb substrate 6 is circular cylindrical, the diameter D of the bottom face (see FIG. 3) is preferably 80 to 150 mm. In the case that the shape of the honeycomb substrate 6 is a shape other than a circular cylindrical shape, the area of the bottom face is preferably the same range as the area of the bottom face in the case of the circular cylindrical shape.

[1-2] Plugging Portion:

The material (ceramic raw material) for the plugging portions 8 with which the honeycomb catalyst body 100 is provided is preferably the same as the material for the partition walls 5 in the honeycomb substrate 6. This enables the plugging portions 8 to be bonded firmly to the partition walls 5 upon firing.

The plugging portions 8 are disposed so as to plug opening portions of part of the cells 4 in the outflow side end face 3, and, by the disposition of the plugging portions 8, exhaust gas flowing into the plugged cells 4a passes through the partition walls 5 and flows into the unplugged cells 4b, the particulate matter which cannot pass through the pores of the partition walls 5 in exhaust gas can be trapped. In addition, the plugging portions 8 are preferably disposed so as to plug adjacent cells 4 alternately. By the disposition of the plugging portions 8 so as to plug adjacent cells 4 alternately, particulate matter in exhaust gas can effectively be trapped. Here, when the shape of the cells 4 is polygonal, "adjacent" means that each side of the polygon is adjacent.

Figure 3:
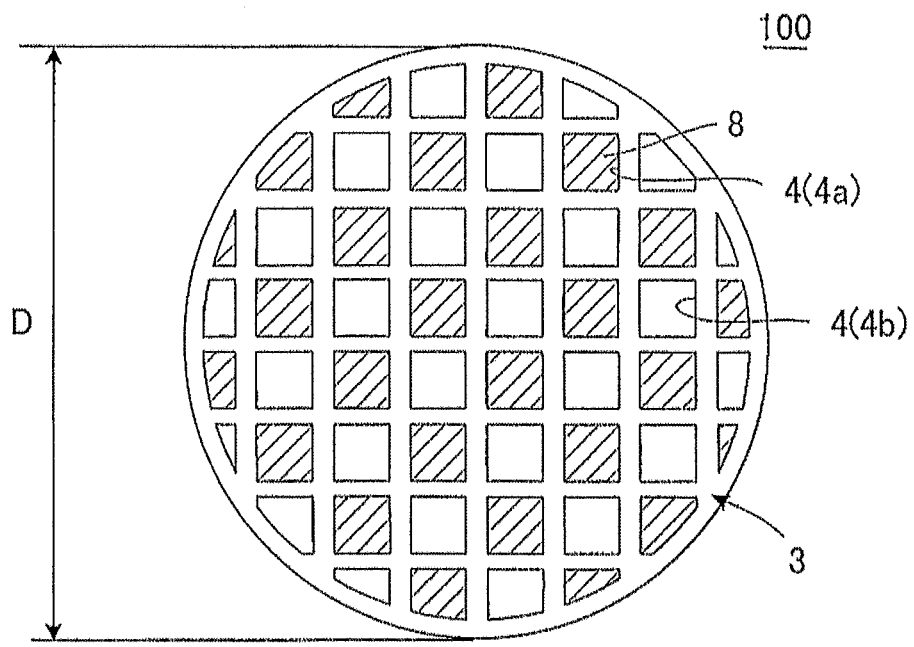
FIG. 3 is a plan view schematically showing an outflow side end face of an embodiment of a honeycomb catalyst body of the present invention.

For example, FIG. 3 is a plan view schematically showing an outflow side end face of an embodiment of a honeycomb catalyst body of the present invention, which is an example where the plugging portions 8 are disposed so as to plug adjacent cells 4 alternately. Specifically, predetermined cells (part of the cells 4) 4a having plugging portions 8 therein and the remaining cells 4b open in both the end portions are disposed alternately to show a checkerwise pattern.

In addition, the plugging portions 8 are preferably disposed so as to plug adjacent unit cell groups 34 alternately when a cell group of adjacent cells 4 is defined as a unit cell group 34. Here, when the aforementioned unit cell groups get together to form the honeycomb substrate 6, the number of the cells 4 constituting each unit cell group 34 does not have to be fixed. In addition, the cells 4 located in the outermost periphery have forms along the outer peripheral portion.

In other words, it means that, when the aforementioned cells 4 are considered to be constituted by defining a cell group constituted of adjacent cells 4 in the outflow side end face 3 of the honeycomb catalyst body 100 where opening portions of cells 4 are disposed vertically and horizontally as a unit cell group 34 and by a plurality of unit cell groups 34 being disposed to be adjacent to one another, the plugging portions 8 are disposed so as to plug the adjacent unit cell groups 34 alternately.

Further, in other words, it means that, in the outflow side end face 3 of the honeycomb catalyst body 100 where opening portions of a plurality of cells 4 are disposed vertically and horizontally, when the outflow side end face 3 is divided into unit cell groups 34 (constituent unit) constituted of the adjacent cells 4, the plugging portions 8 are disposed to plug adjacent unit cell groups 34 alternately.

When the plugging portions 8 are disposed as described above, since the flow rate of the exhaust gas passing through the partition walls 5 is high in comparison with the case where the plugging portions 8 are disposed so as to plug adjacent cells 4 alternately (see FIG. 3), the particulate matter in exhaust gas can be trapped effectively. Here, the shape of the unit cell group 34 is polygon, "adjacent" means that each side of the polygon is adjacent.

Figure 4:
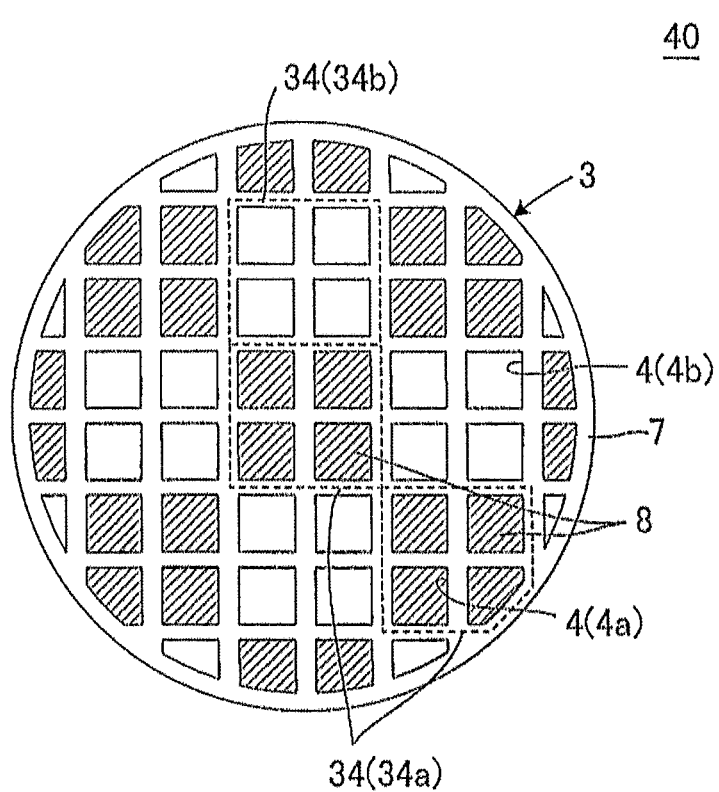
FIG. 4 is a plan view schematically showing an outflow side end face of another embodiment of a honeycomb catalyst body of the present invention.
Figure 5:
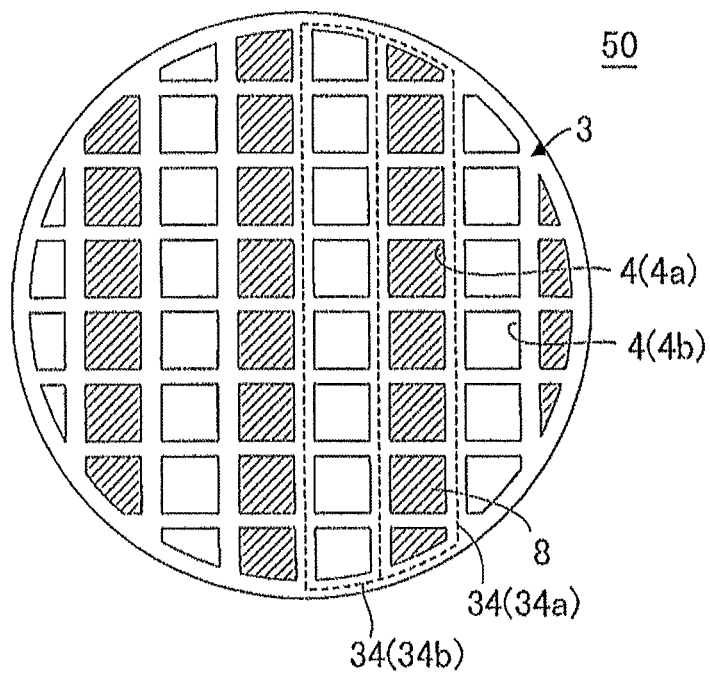
FIG. 5 is a plan view schematically showing an outflow side end face of still another embodiment of a honeycomb catalyst body of the present invention.
Figure 6:
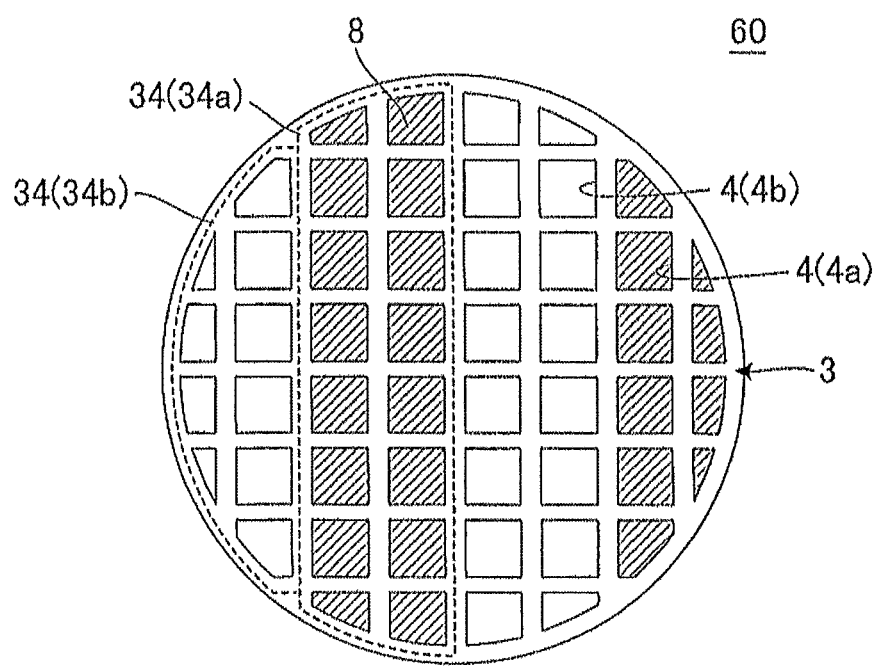
FIG. 6 is a plan view schematically showing an outflow side end face of still another embodiment of a honeycomb catalyst body of the present invention.

FIGS. 4 to 6 are plan views each schematically showing the outflow side end face of another embodiment of a honeycomb catalyst body of the present invention, which shows an example where plugging portions 8 are disposed so as to plug adjacent unit cell groups alternately when a cell group constituted of adjacent cells is defined as a unit cell group 34. Incidentally, in FIGS. 4 to 6, common constituents have the same reference numerals.

Specifically, when a cell group constituted of adjacent four cells 4 (2×2) is defined as a unit cell group 34, FIG. 4 is an example showing a checkerwise pattern where the plugging portions 8 are disposed alternately for adjacent unit cell groups 34 in the outflow side end face 3 of the honeycomb catalyst body 40. That is, FIG. 4 is an example where, among the predetermined unit cell groups 34a and the remaining unit cell groups 34b alternately adjacent, the plugging portions 8 are disposed in the predetermined unit cell groups 34a.

FIG. 5 is an example where, when a cell group of adjacent cells 4 forming a line with the cells 4 in both the end portions being positioned in the outermost periphery is defined as a unit cell group 34 with the unit cell groups 34 parallel and adjacent to one another, plugging portions 8 are disposed alternately in adjacent unit cell groups 34 to form a stripe pattern in the outflow side end face of honeycomb catalyst body 50. That is, FIG. 5 is an example where, among the predetermined unit cell groups 34a and the remaining unit cell groups 34b alternately adjacent, the plugging portions 8 are disposed in the predetermined unit cell groups 34a.

FIG. 6 is an example where, when a cell group of adjacent cells 4 forming two lines with the cells 4 in both the end portions being positioned in the outermost periphery is defined as a unit cell group 34 with the unit cell groups 34 parallel and adjacent to one another, plugging portions 8 are disposed alternately in adjacent unit cell groups 34 to form a stripe pattern in the outflow side end face of honeycomb catalyst body 60. That is, FIG. 6 is an example where, among the predetermined unit cell groups 34a and the remaining unit cell groups 34b alternately adjacent, the plugging portions 8 are disposed in the predetermined unit cell groups 34a.

The depth of plugging portions 8 is preferably 1 to 5 mm, more preferably 1 to 3 mm. When it is smaller than 1 mm, strength of the plugging portions 8 may be depressed. On the other hand, when it is larger than 5 mm, the area where PM is trapped in the partition walls 5 may become small. Here, the depth of the plugging portions 8 means the length of the plugging portions 8 in the cell 4 extension direction.

In addition, the honeycomb catalyst body 100 may have an outer peripheral wall located in the outermost periphery thereof. Incidentally, the outer peripheral wall is preferably a formed unitary layer which is formed unitarily with the honeycomb substrate 6 upon forming. However, a cement coat layer formed of ceramic cement or the like is also a preferable mode with grinding the outer periphery of the honeycomb substrate 6 after the forming to obtain a predetermined shape. In the case of a formed unitary layer, the material (ceramic raw material) is preferably the same as the material for the honeycomb catalyst body 100. In addition, in the case that the outer peripheral wall is a cement coat layer, the material (ceramic raw material) for the cement coat layer may be a material obtained by adding a flux component such as glass to a common green body. In addition, the thickness of the outer peripheral wall is preferably 0.5 to 1.5 mm.

[1-3] Ternary Catalyst:

The three way catalyst means a catalyst for purifying mainly hydrocarbon (HC), carbon monoxide (CO), and nitrogen oxide (NOx). An example is a catalyst containing platinum (Pt), palladium (Pd), and rhodium (Rh). By this three way catalyst, hydrocarbon, carbon monoxide, and nitrogen oxide are purified into water and carbon dioxide, carbon monoxide, and nitrogen, respectively, by oxidation or reduction.

The load amount per unit volume of the three way catalyst loaded on the partition walls 5 in the inflow side region 31 is necessarily 100 to 400 g/L, preferably 120 to 300 g/L, more preferably 120 to 250 g/L. When the load amount is below 100 g/L, it may be difficult to sufficiently purify exhaust gas. On the other hand, when it is above 400 g/L, the pressure loss becomes excessive, and thermal capacity of the inflow side region 31 increases to take too much time until the temperature reaches catalyst activation temperature, and thereby purification efficiency of exhaust gas may fall.

[1-4] Catalyst:

As described above, it is necessary that the load amount per unit volume of the catalyst loaded on the partition walls 5 in the outflow side region 32 of the honeycomb substrate 6 is smaller than that of the three way catalyst loaded on the partition walls 5 in the inflow side region 31 and is 100 g/L or less, or that no catalyst is loaded on the partition walls 5 in the outflow side region 32 of the honeycomb substrate 6.

Examples of the aforementioned catalyst include a three way catalyst, an oxidation catalyst, a NOx selective reduction SCR catalyst, and a NOx absorber catalyst. The oxidation catalyst contains a noble metal, and the noble metal is preferably at least one kind selected from the group consisting of Pt, Rh, and Pd. The total amount of noble metal is preferably 0.17 to 7.07 g per unit volume (1 cm$^3$) of the one side plugged honeycomb structure 100.

As the three way catalyst, the same catalyst as the three way catalyst with which the aforementioned honeycomb catalyst body 100 is provided can be used.

As the NOx selective reduction SCR catalyst, there may be employed at least one kind selected from the group consisting of metal substitution zeolite, vanadium, titania, tungsten oxide, silver, and alumina. In addition, as the NOx adsorber catalyst, there may be employed an alkali metal and/or alkali earth metal. Examples of the alkali metal include K, Na, and Li. Examples of the alkali earth metal include Ca. The total amount of K, Na, Li, and Ca is preferably 0.5 g or more per unit volume (1 cm$^3$) of the one side plugged honeycomb structure 100.

In addition, when a catalyst is loaded on the partition walls 5 in the outflow side region 32 of the honeycomb substrate 6, the load amount per unit volume of the catalyst is necessarily 100 g/L or less, more preferably 10 to 100 g/L, and more preferably 30 to 100 g/L. When the aforementioned load amount is above 100 g/L, since pores of the partition walls 5 is easily clogged with the catalyst, the flow rate of exhaust gas passing through the partition walls 5 is reduced to make particulate matter-trapping efficiency fall and pressure loss increase.

[1-5] Method for Manufacturing Honeycomb Catalyst Body:

An embodiment of a honeycomb catalyst body can be formed by, for example, the following method. In the first place, a forming raw material is kneaded to obtain kneaded clay. Next, the kneaded clay is subjected to extrusion forming into a honeycomb shape to obtain a honeycomb formed article having a plurality of cells formed therein. Next, after plugging opening portions of part of the cells in one end face of the honeycomb formed article obtained above, the honeycomb formed article is fired to obtain a one side plugged honeycomb fired body where plugging portions are disposed by plugging opening portions of part of the cells in the one side end face. Next, catalyst slurry is allowed to flow into the region (inflow side region) from the one side end face to a predetermined position of the one side plugged honeycomb fired body obtained above to apply a three way catalyst on the partition walls in the inflow side region, thereby manufacturing a honeycomb catalyst body.

The forming raw material is preferably a material obtained by adding a dispersion medium and an additive to a ceramic raw material. As the additive, there may be employed an organic binder, a pore former, or a surfactant. An example of the dispersion medium is water.

The ceramic raw material is preferably at least one kind selected from the group consisting of silicon carbide, silicon-silicon carbide based composite material, cordierite-forming raw material, mullite, alumina, spinel, silicon carbide-cordierite based composite material, lithium aluminum silicate, and aluminum titanate. Of these, a cordierite-forming raw material having small thermal expansion coefficient and excellent thermal shock resistance is preferable. The content of the ceramic raw material is preferably 70 to 90% by mass with respect to the entire forming raw materials.

As the organic binder, there may be employed methyl cellulose, hydroxypropoxyl cellulose, hydroxyethyl cellulose, carboxymethyl cellulose, and polyvinyl alcohol. Of these, it is preferable to use methyl cellulose and hydroxypropoxyl cellulose together. The content of the binder is preferably 1 to 10% by mass with respect to the entire forming raw materials. These may be used alone, or a combination of two or more kinds may be used.

There is no particular limitation on the pore former as long as it becomes pores after firing, and, for example, starch, a resin balloon, water-absorbing resin, silica gel and the like may be used. The content of the pore former is preferably 0 to 20% by mass with respect to the forming raw material. In addition, by suitably controlling the particle diameter and the amount of the pore former, the pore size and the porosity of the partition walls can be controlled. These may be used alone, and a combination of two or more kinds can be used.

As the surfactant, there may be used ethylene glycol, dextrin, fatty acid soap, polyalcohol, or the like. These may be used alone, or a combination of two or more kinds may be used. The content of the surfactant is preferably 0.1 to 5% by mass with respect to the entire forming raw materials.

The content of the dispersion medium is preferably 25 to 35% by mass with respect to the entire forming raw materials.

By adjusting the particle diameter and the compounding amount of the ceramic raw material (framework particles) to be used and the particle diameter and the compounding amount of the pore former to be added, a porous substrate having desired porosity and average pore size can be obtained.

There is no particular limitation on the method for forming kneaded clay by kneading the forming raw material, and, for example, a method for employing a kneader, a vacuum kneader, or the like may be employed. The extrusion forming can be performed by using a die having desired cell shape, partition wall thickness, and cell density. The material for the die is preferably superhard alloy, which hardly abrades away.

As a method for plugging openings of cells, there may be employed a method where plugging material is filled into the openings of the cells. As a specific method for filling the plugging material, a mask is applied on one end face of a honeycomb formed article so as to cover the opening portions of the cells. Then, through-holes are made by a laser or the like in portions corresponding to the openings of part of the cells. On the other hand, slurried plugging material containing a ceramic raw material, water or alcohol, and an organic binder is stored in a storage container. The ceramic raw material is preferably the same as the ceramic raw material used as the raw material for the honeycomb formed article. The ceramic raw material is preferably at 70 to 90% by mass of the entire plugging material. In addition, the water or alcohol is preferably at 10 to 30% by mass of the entire plugging material, and the organic binder is preferably at 0.1 to 2.0% by mass of the entire plugging material. As the organic binder, there may be used hydroxypropoxylmethyl cellulose, methyl cellulose, or the like.

Then, the end portion having the mask is immersed in the slurried plugging material to form plugging portions 8 by filling the plugging material into the opening portions of the cells without the mask. The viscosity of the plugging material is preferably 600 to 1200 Pa·s. Incidentally, the viscosity of the plugging material is a value measured at 30° C. with a rotation frequency of 30 rpm by a rotary viscometer. Here, though there is no particular limitation on the formation pattern of the through-holes, the pattern is preferably a pattern where the plugged predetermined cells 4a and the unplugged remaining cells 4b are alternately disposed in the outflow end face 3 of the one side plugged honeycomb fired article to be formed.

In addition, the firing temperature can be determined suitably according to the material for the honeycomb formed article. For example, in the case that the material for the honeycomb formed article is cordierite, the firing temperature is preferably 1380 to 1450° C., more preferably 1400 to 1440° C. In addition, the firing time is preferably about 3 to 10 hours.

Incidentally, a honeycomb formed article may be dried before firing. Though the drying method is not particularly limited, there may be employed, for example, hot air drying, microwave drying, dielectric drying, reduced pressure drying, vacuum drying, freeze drying, or the like. Of these, it is preferable to perform dielectric drying, microwave drying, or hot air drying alone or in combination. In addition, the preferable drying conditions are 30 to 150° C. for 1 minute to 2 hours.

Incidentally, it is also possible that, before plugging portions 8 are formed in a honeycomb formed article, the honeycomb formed article is fired to obtain a honeycomb fired article, followed by forming plugging portions 8 in opening portions of part of the cells in one end face of the honeycomb fired article and then firing again to obtain a one side plugged honeycomb fired article.

There is no particular limitation on the method for applying the catalyst slurry (loading the three way catalyst), and any known method can be applied. For example, in the first place, catalyst slurry containing the three way catalyst is prepared. Then, the catalyst slurry is allowed to flow into the cells in a region (inflow side region 31) from one end face to the predetermined portion of the one side plugged honeycomb fired article. The catalyst slurry is preferably applied to the entire surfaces of the partition walls 5 in the inflow side region 31. After the catalyst slurry is allowed to flow into the cells, superfluous slurry is blown away by compressed air. After that, the catalyst slurry is dried and baked, a honeycomb catalyst body where a three way catalyst is loaded on the partition walls 5 in the inflow side region 31 can be obtained. Incidentally, the preferable drying conditions are 80 to 150° C. for 1 to 6 hours. The preferable baking conditions are 450 to 700° C. for 0.5 to 6 hours. Incidentally, components other than the catalyst contained in the catalyst slurry are alumina and the like. The inflow side region 31 is a region from the inlet side end face 2 of the one side plugged honeycomb fired article (honeycomb substrate 6) to a position of 10 to 90% of the length in the central axial direction of the one side plugged honeycomb fired article (honeycomb substrate 6) from the inflow side end face 2.

Figure 7:
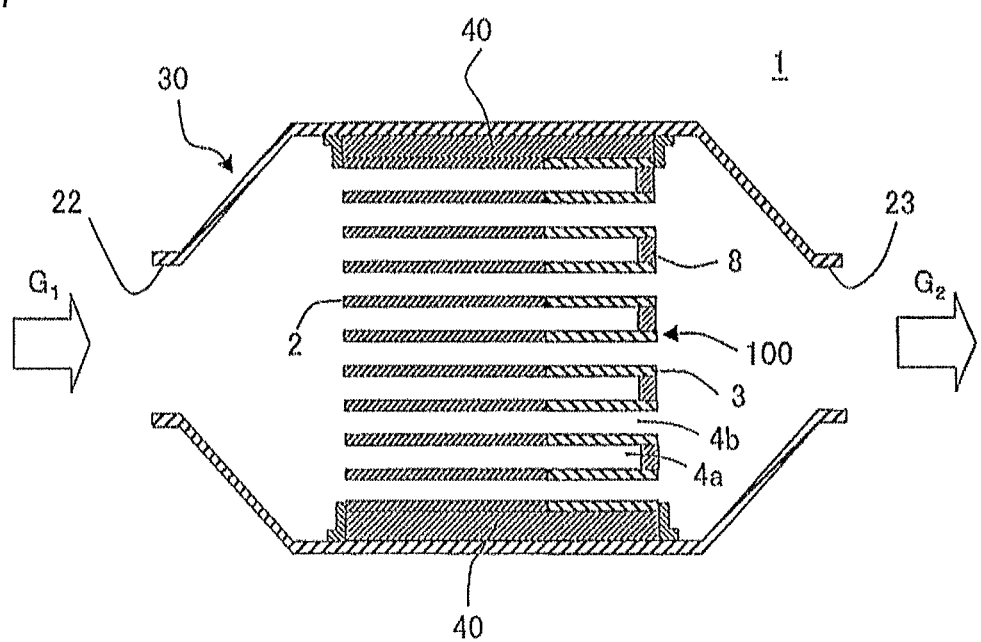
FIG. 7 is a schematic view showing a cross section parallel to the central axis of an exhaust gas purification apparatus obtained by placing an embodiment of a honeycomb catalyst body of the present invention in a can.

[2] Exhaust Gas Purification Apparatus:

A honeycomb catalyst article of the present invention can function as an exhaust gas purification apparatus by being put in a can. FIG. 7 is a schematic view showing a cross section parallel to the central axis of an exhaust gas purification apparatus obtained by putting an embodiment of a honeycomb catalyst article of the present invention in a can. The exhaust gas purification apparatus 1 is provided with a can 30 having an inlet 22 where the exhaust gas $G_1$ enter the apparatus and the outlet 23 where the purified exhaust gas $G_2$ is discharged and the honeycomb catalyst body 100 of the present embodiment put in the can 30 in such a manner that the inflow side end face 2 faces the inlet 22 of the can 30. In addition, a cushion material 40 is wrapped around a honeycomb catalyst body 100.

In such an exhaust gas purification apparatus 1, since the inflow side end face 2 of the honeycomb catalyst body 100 is put in the can 30 in such a manner that the inflow side end face 2 faces the inlet 22 of the can 30, temperature of the end portion on the fluid (exhaust gas) inflow side easily rises due to the heat of the exhaust gas to activate the three way catalyst loaded in the end portion on the inflow side for a short period of time right from the engine starting. Therefore, CO, HC, and NOx contained in exhaust gas can be purified with high efficiency right from the engine starting. In addition, since the honeycomb catalyst body 100 is provided with a honeycomb substrate 6 having porous partition walls 5, exhaust gas particulate matter discharged from a gasoline direct injection can be removed efficiently. That is, in the honeycomb catalyst body 100, since the remaining cells 4b open in both the end portions (i.e., through-holes passing through from the inflow side end face 2 to the outflow side end face 3) are formed, a part of particulate matter contained in exhaust gas discharged from a gasoline direct injection passes through the remaining cells 4b. However, even though the particulate matter contained in exhaust gas is not completely removed, the amount of particulate matter contained in exhaust gas discharged from a gasoline engine is by far smaller than that of the particulate matter contained in exhaust gas discharged from a diesel engine. Therefore, with the honeycomb catalyst body 100, particulate matter discharged without being removed is very little. Further, in a honeycomb catalyst body 100, since the remaining cells 4b open in both the end portions (i.e., through-holes passing through from the inflow side end face 2 to the outflow side end face 3) are formed, increase in pressure loss is little.

The can 30 is not particularly limited, and a can usually used for putting a ceramic honeycomb filter for purifying exhaust gas such as automobile exhaust gas can be used. The material for the can 30 may be metal such as stainless steel. The size of the can 30 is preferably such a size that the honeycomb catalyst body 100 can be pressed into the can 30, with a cushion material 40 being wrapped around the honeycomb catalyst body.

As the can 30, a conventionally known can may be used and can be manufactured by, for example, subjecting a plate material of a ferrite based stainless steel to press working and welding. Specifically, the diameter of the inlet 22 of the can 30 is preferably 30 to 80 mm, and the diameter of the outlet 23 of the can is preferably 30 to 80 mm.

In addition, in the exhaust gas purification apparatus 1 shown in FIG. 7, the honeycomb catalyst body 100 was put in the can 30 in the state that the periphery of the honeycomb catalyst body is covered with a cushion material 40 (i.e., the state that a cushion material 40 is wrapped). This cushion material 40 inhibits the honeycomb catalyst body 100 from being damaged. In addition, it is preferable that the honeycomb catalyst body 100 is put in the can 30 in the state that pressure is applied on the honeycomb catalyst body 100 from outside via the cushion material 40. The housing in such a state enables to inhibit the honeycomb catalyst body 100 from moving in the can 30 and to make the honeycomb catalyst body 100 stable in the can 30. As the cushion material 40, a mat of ceramic fibers or the like may be used.

[2-1] Method for Manufacturing an Exhaust Gas Purification Apparatus:

Next, the exhaust gas purification apparatus 1 can be manufactured by, for example, preparing the can 30 having inlet 22 where the exhaust gas $G_1$ enter the apparatus and the outlet 23 where the purified exhaust gas $G_2$ is discharged and putting the honeycomb catalyst body 1 of the present embodiment in the can 30 in such a manner that the inflow side end face 2 faces the inlet 22 side of the can 30.

In the aforementioned method, it is preferable that, after the outer periphery of the honeycomb catalyst body 100 is covered with the cushion material 40, the honeycomb catalyst body 100 covered with the cushion material 40 is preferably put in the can 30 in the state that the pressure is applied on the honeycomb catalyst body 100 from outside via the cushion material 40.

EXAMPLE

Hereinbelow, the present invention will specifically be described on the basis of Examples. However, the present invention is by no means limited to these Examples.

Example 1

Incidentally, in the first place, alumina, aluminum hydroxide, kaolin, talc, and silica were used as cordierite-forming raw materials, and to 100 parts by mass of the cordierite-forming raw materials were added 13 parts by mass of a pore former, 35 parts by mass of a dispersion medium, 6 parts by mass of an organic binder, and 0.5 parts by mass of a dispersant, and they were mixed and kneaded to prepare kneaded clay. Water was used as the dispersion medium, coke having an average particulate diameter of 1 to 10 μm was used as the pore former, hydroxypropylmethyl cellulose was used as an organic binder, and ethylene glycol was used as a dispersant.

Next, kneaded clay was subjected to extrusion forming using a predetermined die to obtain a honeycomb formed article whose whole shape was a circular columnar shape (circular cylindrical shape) with a quadrangular cell shape. In addition, after the honeycomb formed article was dried with a microwave drier and further completely dried with a hot air drier, both the end faces of the honeycomb formed article were cut off to have a predetermined size. Next, a mask having openings in predetermined portions was applied on the cell opening portions in an end face on one side of the honeycomb formed article, and the end portion having the mask was immersed in plugging slurry containing cordierite-forming raw materials to form plugging portions in part of the cells. Then, the honeycomb formed article having plugging portions formed therein was dried with a hot air drier and then fired at 1410 to 1440° C. for 5 hours to obtain a one side plugged honeycomb fired article with no plugging portion being formed in the openings of all the cells in the inflow side end portion and plugging portions being formed in openings of part of the cells in the outflow side end portion.

Next, mixed particles (specific surface area of 50 m$^2$/g) of γAl$_2$O$_3$ having an average particle diameter of 100 μm and CeO$_2$ having an average particle diameter of 100 μm were subjected to wet grinding with a ball mill to obtain ground particles having an average particle diameter of 5 μm having pores. The ground particles were immersed in a solution containing Pt and Rh to load Pt and Rh in the pores of the ground particles. Then, acetic acid and water were added to the ground particles where Pt and Rh were loaded to obtain coating slurry. The inflow side end portion of the one side plugged honeycomb fired article was immersed in the coating slurry. Specifically, the region from the inflow side end face to the position of 85% of the length in the longitudinal direction of the one side plugged honeycomb fired article from the inflow side end face was immersed in the coating slurry. Thus, the three way catalyst was coated on the partition walls in the predetermined region (inflow side region) to form a catalyst layer. Then, it was dried and fired at 600° C. for 3 hours to obtain a honeycomb catalyst body.

The honeycomb catalyst body thus obtained had a diameter of 110 mm, a length in the central axial direction of 165 mm, a ratio (L/D) of the length L in the central axial direction to the diameter D of the inflow side end face in the honeycomb substrate was 1.5, a cell density of 31 cells/cm$^2$, a rib thickness (partition wall thickness) of 0.25 mm, a partition wall porosity of 75%, and a partition wall average pore size of 40 μm. In the outflow side end face of the honeycomb catalyst body, predetermined cells and the remaining cells were alternately disposed, and plugging portions were disposed in the predetermined cells to have a checkerwise pattern ("plugging portion disposition shape" was "alternate"). The inflow side region was a region from the inflow side end face to the position of 85% of the length in the central axial direction of the honeycomb catalyst body from the inflow side end face. The amount of the catalyst loaded in the inflow side region was 300 g/L, the amount of noble metals in the inflow side region was 2 g/L, the amount of the catalyst loaded in the outflow side region was 10 g/L, and the amount of noble metals in the outflow side region was 0.3 g/L.

Incidentally, the load amount of the oxides (γAl$_2$O$_3$ and CeO$_2$) per unit volume of the honeycomb catalyst body was 100 to 400 g/L, the load amount of Pt per unit volume of the honeycomb catalyst body was 1 to 2.5 g/L, and the load amount of Rh per unit volume of the honeycomb catalyst body was 0.2 to 1 g/L. In addition, the average pore size of the catalyst layer was 5 μm, which was the same as the average particle diameter of the ground particles.

In Table 1, the "length" shows the length in the central axial direction of the honeycomb catalyst body, the "L/D" shows the ratio of the length L in the central axial direction to the diameter D of the inflow side end face in the honeycomb substrate, the "rib thickness" shows thickness of partition walls of the honeycomb substrate, and the "pore size" shows an average pore size. The "plugging portion disposition shape" shows a pattern (shape) formed by the plugging portions in the outflow side end face of the honeycomb catalyst body, and "alternate" means that the predetermined cells 4a and the remaining cells M are alternately disposed in the outflow side end face to show a checkerwise pattern (see FIG. 3) with plugging portions being disposed in the opening portions of the predetermined cells 4a.

Next, the honeycomb catalyst body obtained above was put in a metal (specifically, ferrite based stainless steel) can having an inlet and an outlet in such a manner that the inflow side end face faced the inlet side of the can. Upon putting the honeycomb catalyst body in the can, the outer periphery of the honeycomb catalyst body was covered with a mat containing ceramic fibers as the main component, and the honeycomb catalyst body was pressed into the can in that state and fixed. Thus, the exhaust gas purification apparatus was manufactured.

The exhaust gas purification apparatus was evaluated for "purification rate", "PM number emission", "pressure loss", and "total judgment" by the following method. The results are shown in Table 2. The porosity and the average pore size of the partition wall were measured by a mercury porosimeter. In addition, the "partition wall thickness" was measured by the use of a scanning electron microscope (SEM).

[Purification Rate Measurement Method]

The exhaust gas purification apparatus obtained above is mounted on the exhaust system of an automobile equipped with a displacement 2.0 liter gasoline direct injection engine. Then, as the vehicle test by a chassis dynamometer, emission of carbon monoxide, hydrocarbon, and nitrogen oxide in exhaust gas when driving is performed under driving conditions of Europe regulation driving mode are measured to obtain an emission value. The emission value is compared with the Euro 5 regulation value, and when the emissions of all the components (carbon monoxide, hydrocarbon, and nitrogen oxide) are below the regulation value is evaluated as passed "A", and, when emissions of all the components (carbon monoxide, hydrocarbon, and nitrogen oxide) are not below the regulation value is evaluated as failed "B". Incidentally, the evaluations are shown as "purification rate (CO, HC, NOx)" in Table 2.

[Hydrocarbon Discharge Amount Measurement Method]

A back emission measurement was performed by a measurement method according to Europe regulation to measure the hydrocarbon (HC) discharge amount. When the hydrocarbon discharge amount is below 0.1 g/km, since it fulfills the regulation, it is evaluated as passed "A". When it is 0.1 g/km or more, since the discharge amount does not fulfill the regulation (i.e., the discharge amount is too large with respect to the discharge amount regulation volume), it is evaluated as failed "B". Incidentally, the evaluations are shown as "HC discharge amount (g/km)" in Table 2.

[PM Number Emission Measurement Method]

The exhaust gas purification apparatus is mounted in the exhaust system of an automobile equipped with a displacement 2.0 liter gasoline direct injection engine. Then, as the vehicle test by a chassis dynamometer, the PM discharge number in exhaust gas when driving is performed under driving conditions of Europe regulation driving mode is measured according to the Euro 6 regulation. Incidentally, when the PM discharge number is $6\times10^{11}$ particulates/km or less, it fulfills the Euro 6 regulation. Incidentally, the evaluations are shown as "PM discharge (particulates/km)". When it fulfills the regulation value (when the PM discharge number is $6\times10^{11}$ particulates/km or less), it is evaluated as passed "A", while, when it does not fulfill the regulation value (when the PM discharge number is above $6\times10^{11}$ particulates/km), it is evaluated as failed "B".

[Pressure Loss Measurement Method]

In a bench test of a displacement 2.0 liter gasoline direct injection engine, in the first place, a flow-through type honeycomb structure having a cell density of 93 cells/cm$^2$, a partition wall thickness (rib thickness) of 0.076 mm, a diameter of 105.7 mm, and a length in the central axial direction of 114 mm is mounted in the exhaust system. The pressure loss upon engine full load driving in this state is measured, and the value is defined as the standard value. On the other hand, after the exhaust gas purification apparatus obtained is mounted in the exhaust system, the pressure loss in the above engine full load driving conditions is measured. When the pressure loss increase amount with respect to the aforementioned standard value is below 10 kPa, it is evaluated as passed "A". When the pressure loss increase amount is 10 kPa or more, it is evaluated as failed "B". Incidentally, the evaluations are shown as "pressure loss" in Table 2.

[Total Judgment Evaluation Method]

When all the above evaluations of "purification rate", "hydrocarbon discharge amount", "PM number emission", and "pressure loss" are passed "A", it is evaluated as passed "A", when even one of the above evaluations is failed "B", it is evaluated as failed "B". However, for the evaluation "A", it is necessary that, regarding "hydrocarbon discharge amount", the hydrocarbon discharge amount is below 0.1 g/km, and that, regarding "PM number emission", the PM discharge number is $6\times10^{11}$ particulates/km or less with an evaluation for pressure loss of "A". In addition, in the case that the hydrocarbon discharge amount is 0.1 g/km or more regarding "hydrocarbon discharge amount", in the case that the PM discharge number is above $6\times10^{11}$ particulates/km regarding "PM number emission", or in the case that the evaluation for pressure loss is "B", the evaluation of total judgment is "B".

TABLE 1

| | Honeycomb catalyst body | | | | | | |
|---|---|---|---|---|---|---|---|
| | Diameter (mm) | Length (mm) | L/D | Cell density (cells/cm$^2$) | Rib thickness (mm) | Porosity (%) | Pore size (μm) |
| Example 1 | 110 | 165 | 1.5 | 31 | 0.25 | 75 | 40 |
| Example 2 | 110 | 165 | 1.5 | 46.5 | 0.2 | 65 | 30 |
| Example 3 | 110 | 125 | 1.1 | 62.0 | 0.076 | 38.0 | 8 |
| Example 4 | 110 | 125 | 1.1 | 62.0 | 0.076 | 40.0 | 10 |
| Example 5 | 110 | 165 | 1.5 | 93.0 | 0.051 | 42.0 | 12 |
| Example 6 | 110 | 121 | 1.1 | 93.0 | 0.051 | 50.0 | 20 |
| Example 7 | 110 | 120 | 1.1 | 139.5 | 0.051 | 65.0 | 40 |
| Example 8 | 110 | 165 | 1.5 | 186.0 | 0.051 | 42.0 | 10 |

TABLE 1-continued

| | | | | | | | |
|---|---|---|---|---|---|---|---|
| Example 9 | 110 | 220 | 2.0 | 186.0 | 0.051 | 35.0 | 4 |
| Example 10 | 110 | 165 | 1.5 | 93.0 | 0.076 | 50.0 | 20 |
| Example 11 | 110 | 165 | 1.5 | 93.0 | 0.076 | 50.0 | 20 |
| Example 12 | 110 | 125 | 1.1 | 62.0 | 0.076 | 38.0 | 8 |
| Comp. Ex. 1 | 110 | 165 | 1.5 | 93.0 | 0.051 | 42.0 | 12 |
| Comp. Ex. 2 | 110 | 165 | 1.5 | 93.0 | 0.051 | 42.0 | 12 |
| Comp. Ex. 3 | 110 | 165 | 1.5 | 93.0 | 0.051 | 42.0 | 12 |
| Comp. Ex. 4 | 110 | 165 | 1.5 | 93.0 | 0.051 | 42.0 | 12 |
| Comp. Ex. 5 | 110 | 165 | 1.5 | 93.0 | 0.051 | 42.0 | 12 |
| Comp. Ex. 6 | 110 | 165 | 1.5 | 93.0 | 0.051 | 42.0 | 12 |
| Comp. Ex. 7 | 110 | 250 | 2.3 | 93.0 | 0.051 | 42.0 | 12 |
| Comp. Ex. 8 | 110 | 100 | 0.9 | 93.0 | 0.051 | 42.0 | 12 |

| | | Honeycomb catalyst body | | | |
|---|---|---|---|---|---|
| | | Inflow side region | | Outflow side region | |
| | Plugging portion disposition shape | Length ratio (%) | Catalyst load amount (g/L) | Noble metal amount (g/L) | Catalyst load amount (g/L) | Noble metal amount (g/L) |
| Example 1 | Alternate | 85 | 300 | 2 | 10 | 0.3 |
| Example 2 | Alternate | 90 | 300 | 2 | 10 | 0.3 |
| Example 3 | Alternate | 15 | 400 | 3 | 0 | 0.3 |
| Example 4 | Alternate | 40 | 300 | 2 | 0 | 0.3 |
| Example 5 | Alternate | 40 | 200 | 1 | 20 | 0.3 |
| Example 6 | Alternate every four cells | 55 | 200 | 1 | 20 | 0.3 |
| Example 7 | Alternate every four cells | 55 | 200 | 1 | 20 | 0.3 |
| Example 8 | Alternate every four cells | 55 | 200 | 1 | 50 | 0.3 |
| Example 9 | Alternate every four cells | 65 | 200 | 1 | 50 | 0.3 |
| Example 10 | Every other line | 40 | 100 | 1 | 20 | 0.3 |
| Example 11 | Every other line | 40 | 200 | 1 | 100 | 0.3 |
| Example 12 | Alternate | 10 | 400 | 3 | 0 | 0.3 |
| Comp. Ex. 1 | Alternate | 0 | 300 | 1 | 20 | 0.3 |
| Comp. Ex. 2 | Alternate | 5 | 300 | 1 | 20 | 0.3 |
| Comp. Ex. 3 | Alternate | 55 | 80 | 1 | 20 | 0.3 |
| Comp. Ex. 4 | Alternate | 55 | 500 | 1 | 20 | 0.3 |
| Comp. Ex. 5 | Alternate | 55 | 300 | 1 | 120 | 0.3 |
| Comp. Ex. 6 | Alternate | 95 | 300 | 1 | 20 | 0.3 |
| Comp. Ex. 7 | Alternate | 65 | 300 | 1 | 20 | 0.3 |
| Comp. Ex. 8 | Alternate | 55 | 300 | 1 | 20 | 0.3 |

TABLE 2

| | Purification rate (CO, HC, NOx) | HC discharge amount (g/km) | | PM discharge (particulates/km) | | Pressure loss | Total judgment |
|---|---|---|---|---|---|---|---|
| Example 1 | A | 0.08 | A | $0.55 \times 10^{12}$ | A | A | A |
| Example 2 | A | 0.07 | A | $0.55 \times 10^{12}$ | A | A | A |
| Example 3 | A | 0.035 | A | $0.5 \times 10^{12}$ | A | A | A |
| Example 4 | A | 0.03 | A | $0.5 \times 10^{12}$ | A | A | A |
| Example 5 | A | 0.03 | A | $0.3 \times 10^{12}$ | A | A | A |
| Example 6 | A | 0.03 | A | $0.3 \times 10^{12}$ | A | A | A |
| Example 7 | A | 0.025 | A | $0.1 \times 10^{12}$ | A | A | A |
| Example 8 | A | 0.02 | A | $0.1 \times 10^{12}$ | A | A | A |
| Example 9 | A | 0.02 | A | $0.1 \times 10^{12}$ | A | A | A |
| Example 10 | A | 0.03 | A | $0.2 \times 10^{12}$ | A | A | A |
| Example 11 | A | 0.07 | A | $0.2 \times 10^{12}$ | A | A | A |
| Example 12 | A | 0.04 | A | $0.5 \times 10^{12}$ | A | A | A |
| Comp. Ex. 1 | B | 0.35 | B | $0.1 \times 10^{12}$ | A | A | B |
| Comp. Ex. 2 | B | 0.3 | B | $0.1 \times 10^{12}$ | A | A | B |
| Comp. Ex. 3 | B | 0.3 | B | $0.3 \times 10^{12}$ | A | A | B |
| Comp. Ex. 4 | A | 0.05 | A | $0.3 \times 10^{12}$ | A | B | B |
| Comp. Ex. 5 | A | 0.02 | A | $0.9 \times 10^{12}$ | B | B | B |
| Comp. Ex. 6 | A | 0.02 | A | $0.8 \times 10^{12}$ | B | B | B |
| Comp. Ex. 7 | A | 0.02 | A | $0.1 \times 10^{12}$ | A | B | B |
| Comp. Ex. 8 | B | 0.12 | B | $0.8 \times 10^{12}$ | B | A | B |

Examples 2 to 12, Comparative Examples 1 to 8

Each of the honeycomb catalyst bodies in Examples 2 to 12 and Comparative Examples 1 to 8 was manufactured in the same manner as in Example 1 except for employing the diameter, length, L/D, cell density, rib thickness, porosity, pore size, plugging portion disposition shape, length ratio, catalyst load amount in the inflow side region, noble metal amount in the inflow side region, catalyst load amount in the outflow side region, and noble metal amount in the outflow side region shown in Table 1. Then, each of the honeycomb catalyst body was put in a can to manufacture an exhaust gas purification apparatus, which was evaluated for "purification rate", "hydrocarbon discharge amount", "PM number emission", "pressure loss", and "total judgment" in the aforementioned methods in the same manner as in Example 1. The results are shown in FIG. 2.

In Table 2, "alternate every four cells" means that plugging portions are alternately disposed in adjacent unit cell group (see FIG. 4) when the cell group of adjacent four (2×2) cells is defined as a unit cell group (see reference numeral 34 in FIG. 4) to dispose predetermined unit cell groups and the remaining unit cell groups alternately in a checkerwise pattern, and "every other line" means that plugging portions are alternately disposed in adjacent unit cell group (see FIG. 5) when the cell group of adjacent cells in a line with the cells located in both the end portions is determined as a unit cell group (see reference numeral 34 in FIG. 5) to form the unit cell groups parallel and adjacent to one another. The "length ratio (%)" shows a predetermined position in the inflow side region. For example, the length ratio of 85% means that the inflow side region is the region from the inflow side end face to the position of 85% of the length in the central axial direction of the honeycomb catalyst body from the inflow side end face.

As is clear from Table 2, it could be confirmed that the honeycomb catalyst bodies of Examples 1 to 12 can remove exhaust gas particulate matter discharged from a gasoline direct injection engine efficiently in comparison with honeycomb catalyst bodies of Comparative Examples 1 to 8, have little increase in pressure loss, and can purify CO, HC, and NOx contained in exhaust gas with high efficiency.

In Comparative Examples 1 and 2, since the length ratio was below 10%, sufficient purification rate could not be obtained. In Comparative Example 3, since the load amount of the three way catalyst loaded on the inflow side region was below 100 g/L, sufficient purification rate could not be obtained. In Comparative Example 4, since the load amount of the three way catalyst loaded in the inflow side region was above 400 g/L, pressure loss was increased. In Comparative Example 5, since the load amount of the catalyst in the outflow side region was above 100 g/L, the pressure loss was increased, and, since PM trapping efficiency fell by the decrease of the partition wall permeated gas amount due to clogging of pores, the PM discharge number was increased in the measurement of PM number emission. In Comparative Example 6, since the length ratio was above 90%, the pressure loss was increased, and, since the amount of gas passing through the partition walls was reduced, the PM discharge number was increased in the measurement of PM number emission. In Comparative Example 7, since the ratio (L/D) of the length in the central axial direction of the honeycomb substrate with respect to the diameter of the inflow side end face of the honeycomb substrate was above 2.0, the pressure loss was increased. In Comparative Example 8, since the ratio (L/D) of the length in the central axial direction of the honeycomb substrate with respect to the diameter of the inflow side end face of the honeycomb substrate was below 1.1, sufficient purification rate could not be obtained, and, since the ratio of the amount of gas passing through the partition walls to the entire gas amount was reduced, the PM discharge number was increased in the measurement of PM number emission.

A honeycomb catalyst body of the present invention can suitably be used for purification of exhaust gas discharged from a gasoline direct injection engine.

What is claimed is:

1. A honeycomb catalyst body comprising:
   a honeycomb substrate having porous partition walls separating and forming a plurality of cells passing through from an inflow side end face to an outflow side end face and functioning as fluid passages,
   plugging portions are disposed only to plug portions of part of the cells in the outflow side end face of the honeycomb substrate, and
   a three way catalyst loaded on the honeycomb structure;
   wherein all the cells in the inflow side end face are open and not plugged with plugging portions and the cells that are not plugged on the outflow side end face are open from the inflow side end face to the outflow side end face,
   the honeycomb substrate has two regions of an inflow side region as a region on a fluid inflow side and an outflow side region as a region on a fluid outflow side,
   the inflow side region of the honeycomb substrate is a region from the inflow side end face to a position of 10 to 90% of a length in an central axial direction of the honeycomb substrate from the inflow side end face, and 100 to 400 g/L of the three way catalyst is loaded on the partition walls in the inflow side region,
   the outflow side region of the honeycomb substrate is a region from the outflow side end face to an end of the inflow side region having, one of (i) a catalyst whose amount per unit volume is smaller than the three way catalyst loaded on the partition walls in the inflow side region and (ii) no catalyst loaded on the partition walls, and
   a ratio of the length in the central axial direction of the honeycomb substrate to a diameter of the inflow side end face of the honeycomb substrate is 1.1 to 2.0,
   wherein a group of adjacent cells extending in a line across the honeycomb catalyst body from an outermost periphery on a first side of the honeycomb catalyst body to an outermost periphery on a second side of the honeycomb catalyst body directly opposite to the first side of the honeycomb catalyst body are defined as a unit cell group, and plugging portions are disposed so as to plug adjacent unit cell groups in an alternating pattern, and
   wherein the unit cell group comprises at least two adjacent lines of adjacent cells extending across the honeycomb catalyst body.

* * * * *